(12) United States Patent
Kim et al.

(10) Patent No.: US 6,724,458 B2
(45) Date of Patent: Apr. 20, 2004

(54) LIQUID CRYSTAL DISPLAY DEVICE AND METHOD OF FABRICATING THE SAME

(75) Inventors: Jong Woo Kim, Kyongsangbuk-do (KR); Sung Chun Kang, Kyongsangbuk-do (KR); Young Hun Ha, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/316,109

(22) Filed: Dec. 11, 2002

(65) Prior Publication Data

US 2003/0117569 A1 Jun. 26, 2003

(30) Foreign Application Priority Data

Dec. 22, 2001 (KR) .................................. 2001-083218

(51) Int. Cl.$^7$ ................................................. G02F 1/13
(52) U.S. Cl. ........................................................ 349/156
(58) Field of Search ................................. 349/155–156, 349/153, 190

(56) References Cited

U.S. PATENT DOCUMENTS

| | | |
|---|---|---|
| 3,978,580 A | 9/1976 | Leupp et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,539,545 A | 7/1996 | Shimizu et al. |
| 5,548,429 A | 8/1996 | Tsujita |
| 5,680,189 A | 10/1997 | Shimizu et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,952,676 A | 9/1999 | Sato et al. |
| 5,956,112 A | 9/1999 | Fujimori et al. |
| 6,001,203 A | 12/1999 | Yamada et al. |
| 6,016,181 A | 1/2000 | Shimada |
| 6,219,126 B1 | 4/2001 | Von Gutfeld |
| 6,236,445 B1 | 5/2001 | Foschaar et al. |
| 6,337,730 B1 | 1/2002 | Ozaki et al. |
| 6,445,437 B1 * | 9/2002 | Miyazaki et al. ........... 349/156 |

FOREIGN PATENT DOCUMENTS

| | | |
|---|---|---|
| JP | 57-38414 | 3/1982 |
| JP | 57-88428 | 6/1982 |
| JP | 58-27126 | 2/1983 |
| JP | 60-164723 | 8/1985 |

(List continued on next page.)

*Primary Examiner*—James A. Dudek
(74) *Attorney, Agent, or Firm*—Morgan, Lewis & Bockius LLP

(57) ABSTRACT

A liquid crystal display device and a method of fabricating the same are disclosed in the present invention. The device includes first and second substrates bonded to each other, each having a liquid crystal display panel region divided into an active area and a dummy area, a sealant in a periphery of the liquid crystal display panel region bonding the first and second substrates to each other, at least one column spacer both in the dummy area and outside the liquid crystal display panel region maintaining a cell gap between the first and second substrates, and a liquid crystal layer between the first and second substrates.

20 Claims, 10 Drawing Sheets

FOREIGN PATENT DOCUMENTS

| | | |
|---|---|---|
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-265011 | 10/1993 |
| JP | 5-281562 | 10/1993 |
| JP | 5-2811557 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-73075 | 3/1997 |
| JP | 9-73096 | 3/1997 |
| JP | 9-061829 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-29035 | 1/2000 |
| JP | 2001-117105 | 4/2001 |
| JP | 2001-133794 | 5/2001 |
| JP | 2001-142074 | 5/2001 |
| JP | 2001-147437 | 5/2001 |
| JP | 2001-154211 | 6/2001 |
| JP | 2001-255542 | 9/2001 |
| JP | 2001-264782 | 9/2001 |
| JP | 2001-330840 | 11/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |

* cited by examiner

UV irradiation

UV irradiation

LIQUID CRYSTAL DISPLAY DEVICE AND METHOD OF FABRICATING THE SAME

This application claims the benefit of the Korean Application No. P2001-083218 filed on Dec. 22, 2001, which is hereby incorporated by reference.

BACKGROUND OF THE INVENTION

1. Field of the Invention

The present invention relates to a display device, and more particularly, to a liquid crystal display device and a method of fabricating the same. Although the present invention is suitable for a wide scope of applications, it is particularly suitable for providing a uniform cell gap in the liquid crystal display device.

2. Discussion of the Related Art

Generally, a liquid crystal display device has characteristics, such as low-voltage driving, low power consumption, full-color implementation, thin and compact size, and the like. Thus, it has been widely used for calculators, notebook computers, electronic watches, PC monitors, aircraft gauges, personal mobile terminals, mobile phones, etc.

Screens of liquid crystal display devices get wider and larger in size. In fabricating wide-screen liquid crystal display devices, a related art method for forming a liquid crystal layer by using vacuum injection takes too much time. Hence, a liquid crystal dropping method of dispensing liquid crystal droplets on a substrate under a vacuum condition has been widely used to resolve the problems in the conventional fabrication process.

When the liquid crystal layer is formed by the liquid crystal dropping method, a fabricating time can be reduced. The liquid crystal dropping method uses a UV-ray hardening sealant for bonding upper and lower substrates to each other.

The UV-ray hardening sealant is provided by mixing acrylate resin with a photo-hardener, which becomes a radical when a UV-ray is irradiated thereto at a predetermined ratio. The photo-hardener reacts with the acrylate to form polymer having strong adhesion to the glass substrate.

A spacer is used to maintain a uniform cell gap when the substrates are bonded to each other. The spacer types include a ball spacer scattered on the substrate and a column spacer formed on the substrate. The ball spacer may alter the cell gap when applied to a wide area. For this reason, the column spacer is mainly used.

When bonding the two substrates to each other by using a UV-ray hardening sealant, portions of the substrates with the sealant formed thereon are strongly bonded to each other. On the other hand, adhesion of the array portions of the substrates is weaker than that of the portions with the sealant. Thus, a stress is generated between the substrates.

A liquid crystal display device and a method of fabricating the same according to a related art are explained by referring to the attached drawings as follows.

FIG. 1 illustrates a layout of a liquid crystal display device by using a related art liquid crystal dropping method.

As shown in FIG. 1, a thin film transistor (TFT) array is formed in a liquid crystal display panel region on a first substrate 100. A silver (Ag) pattern for applying voltage to a terminal Vcom is formed on the periphery of the liquid crystal display panel region. Liquid crystal droplets are then dispensed onto the liquid crystal display panel region. The liquid crystal display panel region has an active area 120 and a dummy area 130.

Meanwhile, a color filter pattern is formed in the liquid crystal display panel region on a second substrate 150. Column spacers 105 are formed in the active area 120 to correspond to a wiring part excluding a pixel region 112 of the first substrate 100. The column spacers 105 formed on the second substrate 150 are then attached to the second substrate 150. After forming the column spacers 105, a UV-ray hardening sealant pattern 110 is formed on the periphery of the liquid crystal display panel region on the second substrate 150.

Subsequently, a liquid crystal display panel is prepared by bonding the first and second substrates 100 and 150 to each other. A UV-ray is then applied to the UV-ray hardening sealant 110 to harden the UV-ray hardening sealant 110.

The column spacers 105 maintain a uniform cell gap in the active area 120 on the entire surface of the liquid crystal display device. Meanwhile, due to its strong adhesion, the UV-ray hardening sealant pattern 110 pulls the first and second substrates 100 and 150. Therefore, a portion where the sealant pattern 110 is formed generates a stress greater than that in the active area 120. Moreover, since the UV-ray hardening sealant pattern 110 pulls the first and second substrates 100 and 150, the cell gap around the sealant pattern 110 may vary in accordance with the amount of the sealant pattern 110.

FIGS. 2A to 2G illustrate layouts and cross-sectional views illustrating a process of fabricating a liquid crystal display device using a related art liquid crystal dropping method.

A plurality of liquid crystal display panel regions are arranged on parent substrates (i.e., first and second substrates). As shown in FIG. 2A, a plurality of silver (Ag) patterns 201 are formed on the periphery of each liquid crystal display panel region on a first substrate 200.

Referring to FIG. 2B, column spacers 205 are formed in an active area of each liquid crystal display panel region on a second substrate 250 to correspond to a wiring part of the first substrate 200.

Referring to FIG. 2C, a UV-ray hardening sealant pattern 210 is formed on the periphery of each liquid crystal display panel region on the second substrate 250.

As shown in FIG. 2D, a predetermined amount of liquid crystal droplets 203 are dispensed on each liquid crystal display panel region of the first substrate 200. The second substrate 250 is disposed over the first substrate 200 to face into a bonding machine. The first and second substrates 200 and 250 are then bonded to each other. More specifically, the second substrate 250 is fixed to an upper stage 270 of the bonding machine, allowing movement in the Z-axis direction (i.e., vertical direction). Meanwhile, the silver (Ag) patterns 201 are disposed on the periphery of the UV-ray hardening sealant 210 on the second substrate 250. And, the first substrate 200 is fixed to a lower stage 260 of the bonding machine, allowing movement in the X and Y axes directions (i.e., horizontal direction).

Referring to FIG. 2E, the upper and lower stages 270 and 260 are aligned to each other, thereby achieving a vacuum condition within the bonding machine. Hence, the first and second substrates 200 and 250 are bonded to each other. After bonding the substrates 200 and 250 in the bonding machine under a vacuum condition, a first cell gap is formed, and then the bonded substrates 200 and 250 are exposed to the atmospheric pressure.

As shown in FIG. 2F, after the bonded substrates 200 and 250 having the first gap are exposed to the atmospheric pressure, a pressure difference between inside the liquid crystal display panel and the atmospheric pressure generates a second cell gap between the bonded substrates 200 and 250. In this case, the dispensed liquid crystal droplets become a liquid crystal layer 203a having a uniform thickness.

Referring to FIG. 2G, the bonded substrates 200 and 250 are placed on a quartz stage 280. A UV-ray is then irradiated to the bonded substrates on a lower side of the first substrate 200 in order to harden the UV-ray hardening sealant pattern 210.

The liquid crystal display device and the method of fabricating the same have the following problems or disadvantages.

The UV-ray hardening sealant pulls the bonded substrates while being hardened, thereby generating a stress between the active area part and the sealant pattern part. Since, the UV-ray hardening sealant pulls the bonded substrates while being hardened, the cell gap around the sealant pattern is altered in accordance with the quantity of the sealant pattern.

SUMMARY OF THE INVENTION

Accordingly, the present invention is directed to a liquid crystal display device and a method of fabricating the same that substantially obviates one or more of problems due to limitations and disadvantages of the related art.

Another object of the present invention is to provide a liquid crystal display device and a method of fabricating the same that enable to maintain a uniform cell gap in a sealant formed portion.

Another object of the present invention is to provide a liquid crystal display device and a method of fabricating the same that enable to reduce a stress caused by a sealant.

In order to achieve the above objects, at least one column spacer in the present invention is formed on the periphery of a sealant pattern.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates bonded to each other, each having a liquid crystal display panel region divided into an active area and a dummy area, a sealant in a periphery of the liquid crystal display panel region bonding the first and second substrates to each other, at least one column spacer both in the dummy area and outside the liquid crystal display panel region maintaining a cell gap between the first and second substrates, and a liquid crystal layer between the first and second substrates.

In another aspect of the present invention, a liquid crystal display device includes a first substrate having a liquid crystal display panel region divided into an active area and a dummy area, a second substrate bonded to the first substrate, a plurality of first column spacers in the liquid crystal display panel region, a sealant in a periphery of the liquid crystal display panel region to bond the first and second substrates to each other, a plurality of second column spacers outside the liquid crystal display panel region around the sealant, and a liquid crystal layer between the first and second substrates.

In another aspect of the present invention, a liquid crystal display device includes first and second substrates bonded to each other, each having a liquid crystal display panel region divided by an active area and a dummy area, at least one first column spacer in the active area, at least one second column spacer in the dummy area, at least one third column spacer outside the liquid crystal display panel region, a sealant in a periphery of the liquid crystal display panel region bonding the first and second substrates to each other, and a liquid crystal layer between the first and second substrates.

In a further aspect of the present invention, a method of fabricating a liquid crystal display device includes preparing first and second substrates having a liquid crystal display panel region divided into an active area and a dummy area, dispensing at least one liquid crystal droplet in the liquid crystal display panel region of the first substrate, forming at least one first column spacer in the active area of the second substrate, forming at least one second column spacer in the dummy area of the second substrate, forming at least one third column spacer outside the liquid crystal display panel region of the second substrate, forming a sealant in a periphery of the liquid crystal display panel region of the second substrate, and bonding the first and second substrates to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
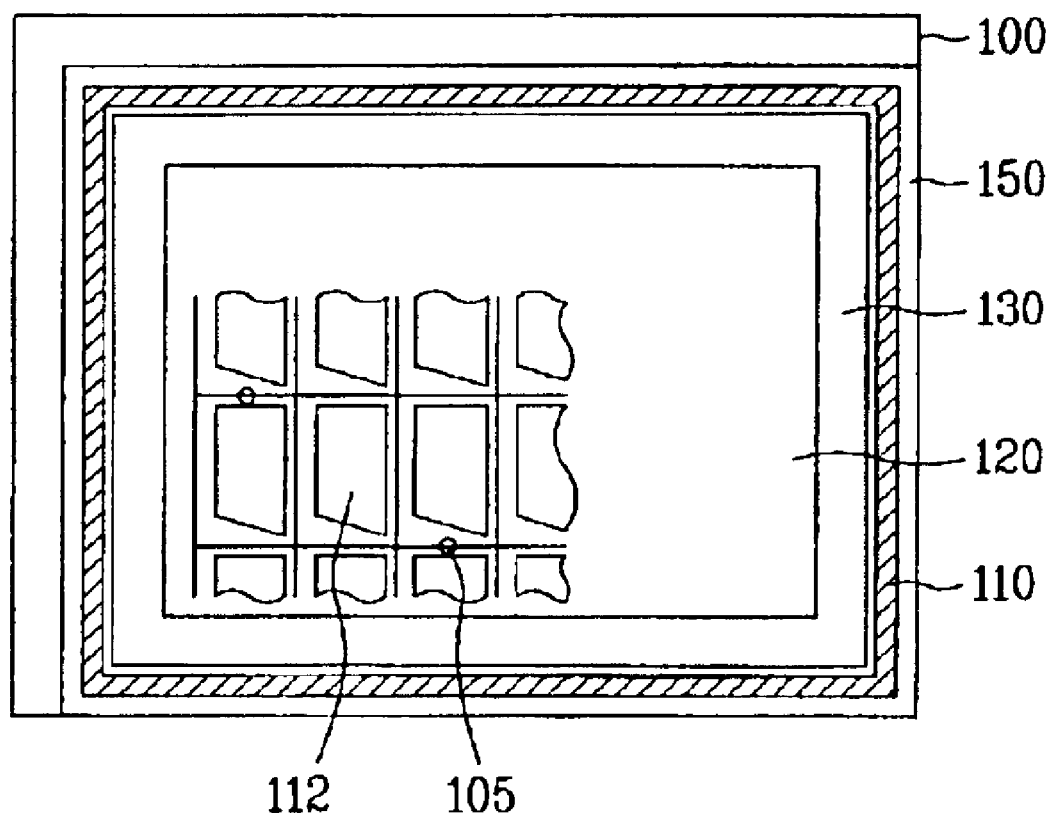
FIG. 1 illustrates a layout of a liquid crystal display device fabricated by using a related art liquid crystal dropping method.
Figure 2A:
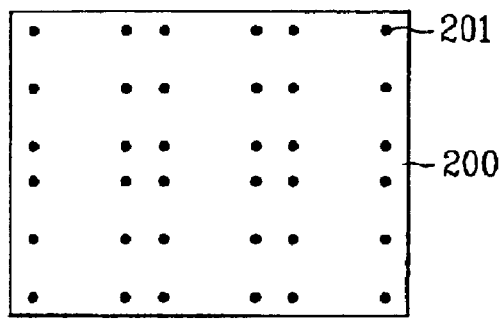
FIGS. 2A to 2G illustrate layouts and cross-sectional views illustrating a process of fabricating a liquid crystal display device using the related art liquid crystal dropping method.
Figure 2B:
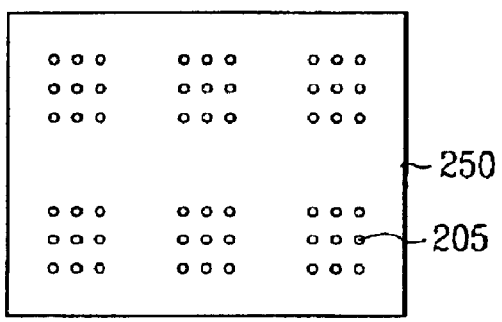
Figure 2C:
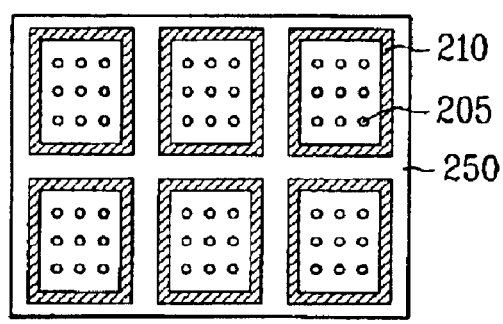
Figure 2D:
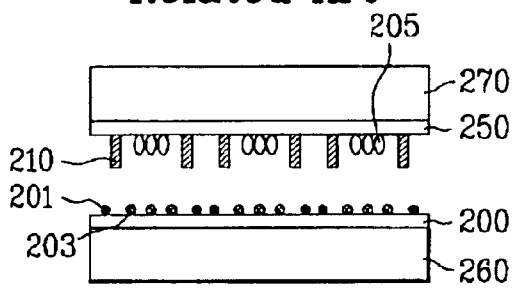
Figure 2E:
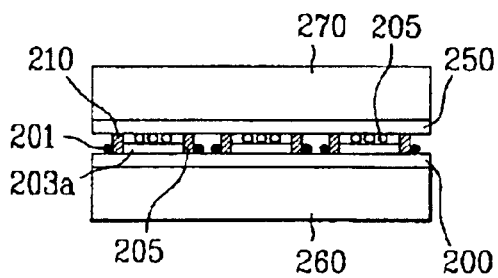
Figure 2F:
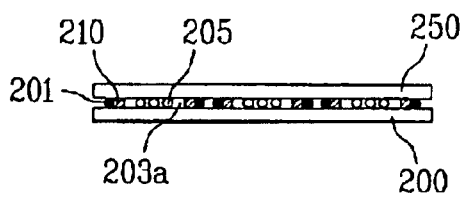
Figure 2G:
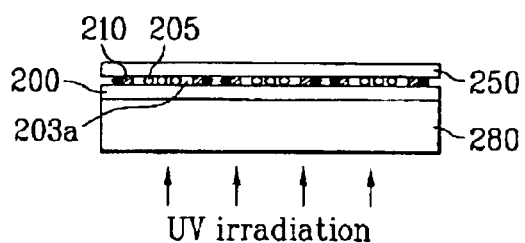
Figure 3A:
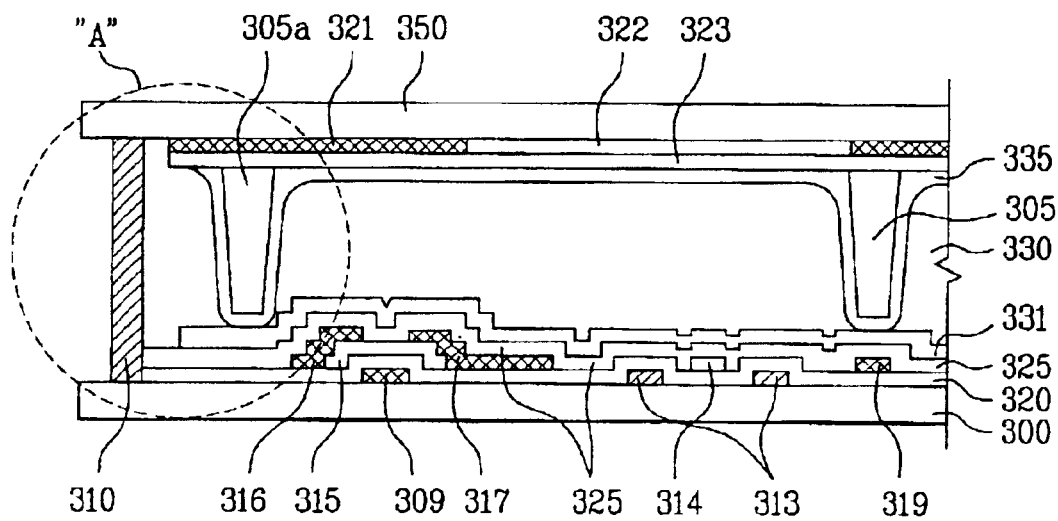
FIG. 3A illustrates a cross-sectional view illustrating a liquid crystal display device for a horizontal electrical field system according to a first embodiment of the present invention.

FIG. 3A illustrates a cross-sectional view illustrating a liquid crystal display device for a horizontal electrical field system according to a first embodiment of the present invention.

Referring to FIG. 3A, a metal layer is deposited on a first substrate 300. A plurality of gate lines (not shown) are formed on the first substrate 300 through photolithography and etching processes. A plurality of gate electrodes 309 and a plurality of common electrodes 313 are formed in a thin film transistor region.

A gate insulating layer 320 is formed on the entire surface including the gate and common electrodes 309 and 313. A semiconductor layer 315 for an active layer is formed on the gate insulating layer 320.

A plurality of data lines 319 are formed on the gate insulating layer 320. Simultaneously, source and drain electrodes 316 and 317 are formed on both sides of the semiconductor layer 315. Additionally, a pixel electrode 314 is formed on the gate insulating layer 320 in parallel with the common electrode and adjacent to the source and drain electrodes 316 and 317.

And, a passivation layer 325 is formed on the entire surface including the source electrode 316, the drain electrode 317, the data line 319, and the pixel electrode 314. A first alignment layer 331 is then formed on the passivation layer 325.

Meanwhile, a black matrix 321 and a color filter layer 322 are formed in the liquid crystal display panel region having the active area 720 and the dummy area 730 on a second substrate 350. An overcoat layer 323 is formed on the upper surface of the black matrix 321 and the color filter layer 322, so as to reduce a surface step difference thereof. The overcoat layer 323 is then patterned. Herein, the black matrix 321 is formed of one of Cr, $CrO_x$, and black resin.

One or more column spacers 305 are formed on the overcoat layer 323 inside an array region of the second substrate 350. Simultaneously, a plurality of column spacers 305a are formed on the overcoat layer 323 outside the array region and inside a UV-ray hardening sealant pattern 310, which will be formed in a later process. A second alignment layer 335 is then formed on the column spacers 305 and 305a as well as the overcoat layer 335.

Subsequently, a UV-ray hardening sealant pattern 310 is formed on the second substrate 350 at the periphery of the column spacers. Liquid crystal droplets are dispensed on the first substrate 300, which is treated for alignment. The second substrate 350 is disposed on the upper surface of the first substrate 300. The first and second substrates 300 and 350 are then bonded to each other.

Figure 3B:
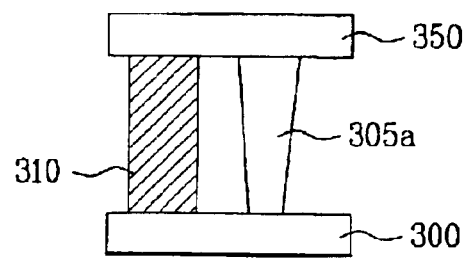
FIG. 3B schematically illustrates a magnified view of an area "A" in FIG. 3A.

FIG. 3B schematically illustrates a magnified view of an area "A" in FIG. 3A.

As shown in FIG. 3B, the column spacer 305a maintains a cell gap between the two substrates 300 and 350 that will be bonded to each other by the UV-ray hardening sealant 310.

Figure 3C:
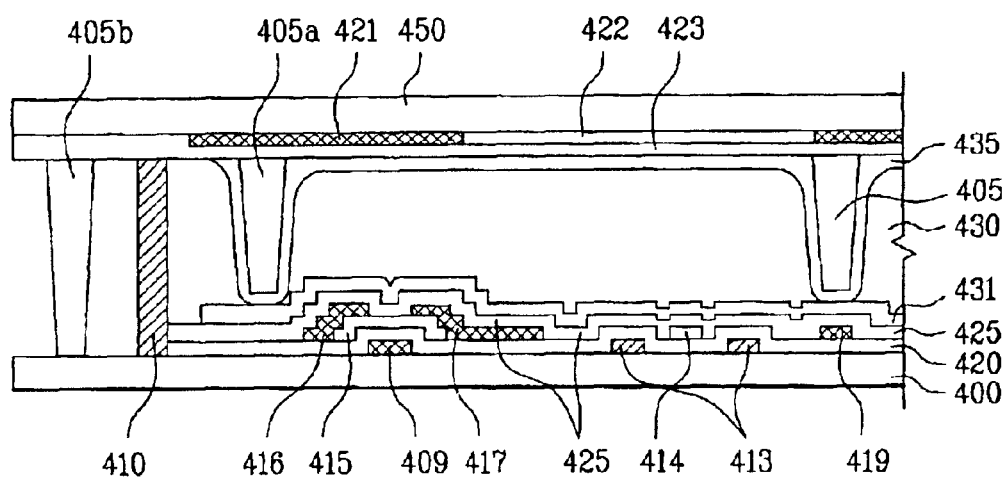
FIG. 3C illustrates a cross-sectional view illustrating a liquid crystal display device for a horizontal electrical field system according to a second embodiment of the present invention.

FIG. 3C illustrates a cross-sectional view illustrating a liquid crystal display device for a horizontal electrical field system according to a second embodiment of the present invention. Unlike in FIG. 3A, the overcoat layer 423 is not patterned in FIG. 3C.

As shown in FIG. 3C, a first column spacer 405 is formed inside an array region on the second substrate 450. Simultaneously, a second column spacer 405a is formed on the inner surface of the UV-ray hardening sealant pattern 410 on the overcoat layer 423. Simultaneously, a third column spacer 405b is also formed on the second substrate on the outer surface of the UV-ray hardening sealant pattern 410.

Subsequently, a second alignment layer 435 is formed on the overcoat layer 423 corresponding to the surfaces of the first and second column spacers 405 and 405a and the inside of the UV-ray hardening sealant 410. And, the UV-ray hardening sealant 410 is formed on the overcoat layer 423 between the second column spacers 405a and the third column spacers 405b.

Thereafter, liquid crystal droplets are dispensed on the first substrate 400 treated with alignment. The second substrate 450 is disposed over the first substrate 400. Then, the first and second substrates 400 and 450 are bonded to each other.

As described above, at least two second and third column spacers 405a and 405b are formed at each side, more specifically, the inside and the outside of the UV-ray hardening sealant 410.

Figure 3D:
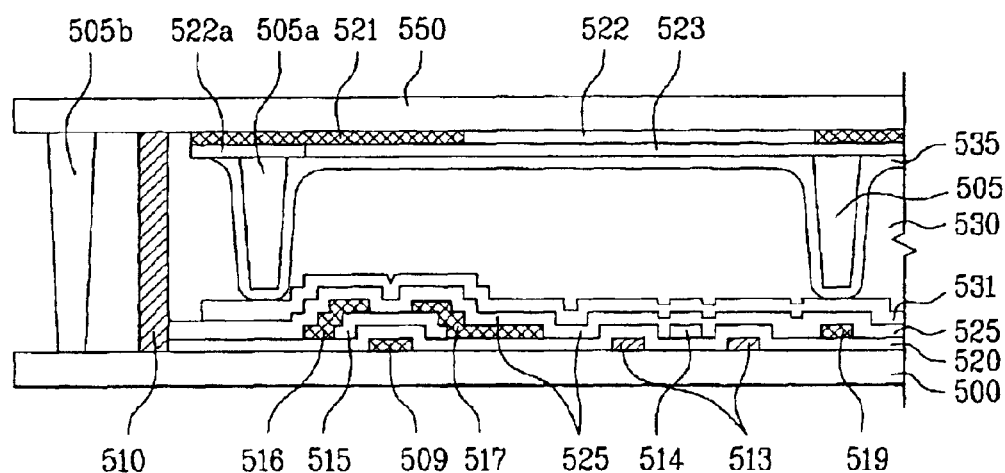
FIG. 3D illustrates a cross-sectional view illustrating a liquid crystal display device for a horizontal electrical field system according to a third embodiment of the present invention.

FIG. 3D illustrates a cross-sectional view illustrating a liquid crystal display device for a horizontal electrical field system similar to those in FIGS. 3A and 3C. However, FIG. 3D differs from FIG. 3C in that the overcoat layer 423 is patterned to be formed inside the array region only. And, a dummy color filter layer 522a is formed on the periphery of the array region within the overcoat layer 523.

In FIG. 3D, a first column spacer 505 is formed on the overcoat layer 523 inside the array region of the second substrate. Simultaneously, a second column spacer 505a is formed on the dummy color filter layer 522a formed on the periphery of the array region. Moreover, a third column spacer 505b is formed on the second substrate 550 on the periphery of the UV-ray hardening sealant pattern 510.

Meanwhile, a second alignment layer 535 is formed on the overcoat layer 523 and the first and second column spacers 505 and 505a in the liquid crystal display panel region.

Subsequently, after the UV-ray hardening sealant pattern 510 is formed, liquid crystal droplets are dispensed on the alignment-treated first substrate 500. The second substrate 550 is disposed over the first substrate 500 and is then bonded to the first substrate 500.

The common and pixel electrodes 513 and 514 may be formed on different layers. They may also be formed on the same layer including the gate insulating layer 520 along with the source and drain electrodes 516 and 517. In addition, the common electrode 513 may be formed on the same layer along with the gate electrode 509, and the pixel electrode 514 may be formed on the passivation layer 525. Moreover, both of the common and pixel electrodes 513 and 514 may be formed on the passivation layer 525.

Therefore, the common and pixel electrodes 513 and 514 may be located regardless of the structure of the liquid crystal display device for the horizontal electrical field system.

Figure 3E:
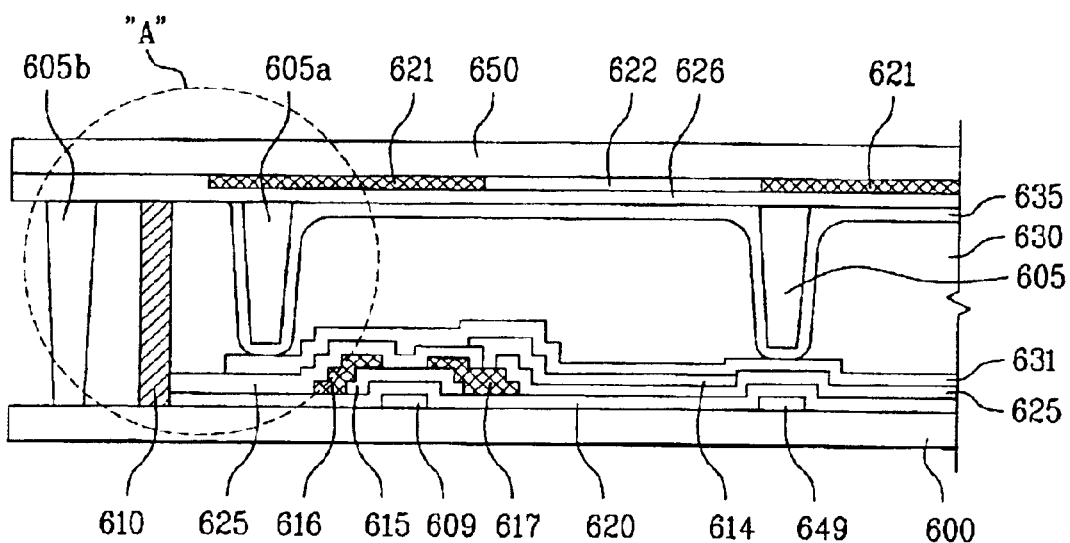
FIG. 3E illustrates a cross-sectional view illustrating a liquid crystal display device for a horizontal electrical field system according to a fourth embodiment of the present invention.

The liquid crystal display device according to the present invention may have the same structure as shown in FIG. 3E.

As shown in FIG. 3E, a metal layer is deposited on a first substrate 600 and treated with photolithography and etching processes. A plurality of gate lines 649 and gate electrodes 609 are then formed thereon. Simultaneously, a plurality of gate electrodes 609 are formed on a region for a thin film transistor. And, a gate insulating layer 620 is formed on the entire exposed surface of the first substrate 600 including the gate electrode 609.

After a semiconductor layer 615 as an active layer is formed on the gate insulating layer 620, source and drain electrodes 616 and 617 are formed on both corresponding sides of the semiconductor layer 615 on the gate insulating layer 620.

After a passivation layer 625 is formed on the entire exposed surface of the gate insulating layer 620 including the source and drain electrodes 616 and 617, a pixel electrode 614 is formed on the passivation layer 625.

Thereafter, a first alignment layer 631 is formed on the entire exposed surface of the passivation layer 625 including the pixel electrode 614.

Meanwhile, a black matrix 621 preventing light leakage is formed on a second substrate 650, and a color filter layer 622 of R/G/B is formed on the second substrate 650 between the black matrix 621.

Subsequently, a common electrode 626 is formed on the color filter layer 622 and the black matrix 621.

Finally, a first column spacer 605 is formed inside the array region on the second substrate 650. Simultaneously, a second column spacer 605a is formed on the common electrode 626 in the periphery of the array region. Moreover, a third column spacer 605b is formed on the common electrode 626 in the periphery of the second column spacer.

Meanwhile, a UV-ray hardening sealant pattern 610 is formed between the second column spacer 605a and the third column spacer 605b. Therefore, the third column spacer 605b is formed on the common electrodes 505b in the periphery of the UV-ray hardening sealant pattern 610.

Subsequently, a second alignment layer 635 is formed on the entire surfaces of the common electrode 626 and the first and second column spacers 605 and 605a in the liquid crystal display panel region. The third column spacer 605b is formed on the common electrode 626. Herein, the second alignment layer 635 is not formed on the third column spacer 605b.

After the UV-ray hardening sealant pattern 610 is formed, liquid crystal droplets are dispensed on the alignment-treated first substrate 600. The second substrate 650 is disposed over the first substrate 600, and then a process of bonding the first and second substrate 600 and 650 to each other is carried out.

The above-explained structure may be applied to various modes, such as vertical alignment (VA) mode, optically compensated birefringence (OCB) mode, ferroelectric liquid crystal (FLC) mode, reflective mode, and TN mode.

Meanwhile, as shown in FIGS. 3A, 3C, and 3D, an overcoat layer may be additionally formed on the color filter layer 622.

Figure 3F:
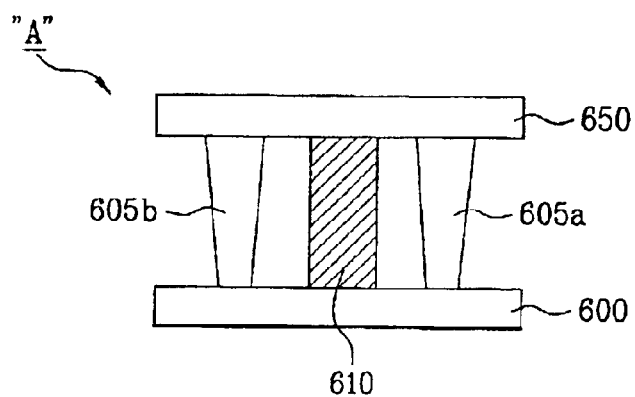
FIG. 3F schematically illustrates a magnified view of an area "A" in FIG. 3E.

FIG. 3F schematically illustrates a magnified view of an area "A" in FIG. 3E.

As shown in FIG. 3F, the second and third column spacers 605a and 605b are formed on both sides of the UV-ray hardening sealant pattern 610, so as to maintain a uniform cell gap between the substrates 600 and 650 as well as to reduce a stress caused by a height difference between the substrates 600 and 650.

The third column spacer 605b, located at the periphery of the UV-ray hardening sealant pattern 610, is located in a position where the bonded substrates 600 and 650 are cut and removed. Hence, the third column spacer 605b may be cut after the liquid crystal display panel is completed.

Figure 4A:
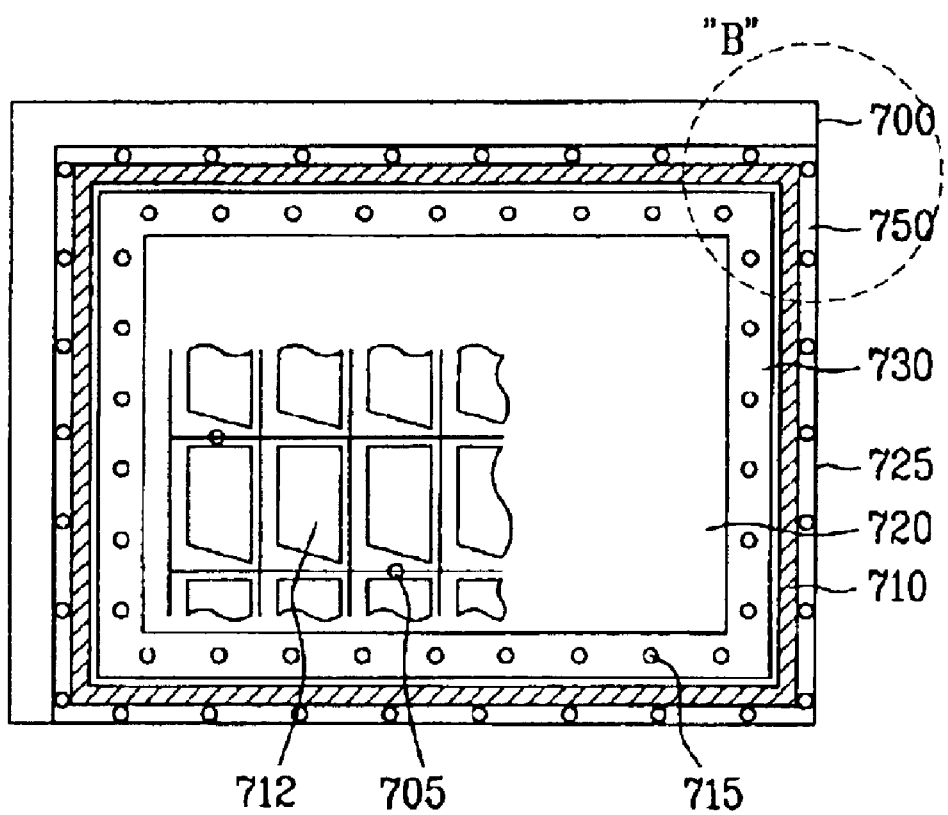
FIG. 4A illustrates a layout of a liquid crystal display device fabricated by using a liquid crystal dropping method according to the present invention.

FIG. 4A illustrates a layout of a liquid crystal display device fabricated by a liquid crystal dropping method according to the present invention.

Referring to FIG. 4A, after thin film transistors are formed on a first substrate 700 in a liquid crystal display panel region having an active area 720 and a dummy area 730, silver (Ag) patterns are formed on the first substrate 700 at the periphery of the liquid crystal display panel region. Liquid crystal droplets are dispensed on the first substrate 700 inside the liquid crystal display panel region.

Meanwhile, a color filter pattern is formed on a second substrate 750. Subsequently, a first column spacer 705 is formed on a wiring part of the array region on the first substrate 700 except for the pixel regions 712. Second column spacers 715 are formed between the inside of the UV-ray hardening sealant pattern 710 and the outside of the array region 720. Moreover, a third column spacer 725 is formed on the outside of the UV-ray hardening sealant pattern 710.

The first to third column spacers 705, 715, and 725 formed of an organic resin material are formed on the second substrate 750. Exposure and development processes are carried out on the organic resin material, in order to form the first to third column spacers 705, 715, and 725.

After liquid crystal droplets are dispensed on the first substrate 700, the second substrate 750 is disposed over the first substrate 700 to face into the first substrate 700. The substrates 700 and 750 are then bonded to each other to form a liquid crystal display panel. Thereafter, a UV-ray is irradiated to the bonded substrates 700 and 750 initially on a lower side of the first substrate 700 to harden the UV-ray hardening pattern 710.

The UV-ray hardening sealant pattern 710 may have a line width smaller or greater than that of the black matrix pattern 730 formed on the second substrate 750. Meanwhile, the UV-ray hardening sealant pattern 710 may shrink occasionally when hardening with UV-ray. Hence, a thermo-hardening sealant may be added to the material of the UV-ray hardening sealant pattern 710.

Therefore, due to the first column spacers 705 in the array region 720, the cell gap in the array region 720, or the active area, is uniformly maintained in the entire area of the liquid crystal display panel.

Moreover, the cell gap around the UV-ray hardening sealant pattern 710 is maintained by the second column spacers 715, formed between the periphery of the array region 720 and the inside of the UV-ray hardening sealant pattern 710, and the third column spacer 725, formed outside the UV-ray hardening sealant pattern 710. In this case, a line width of each of the first to third column spacers 701, 715, and 725 is selected from a range of about 5 to 30 $\mu$m. The first to third column spacers 705, 715, and 725 may be formed of an organic resin material, such as a photo-reactive resin material.

Figure 4B:
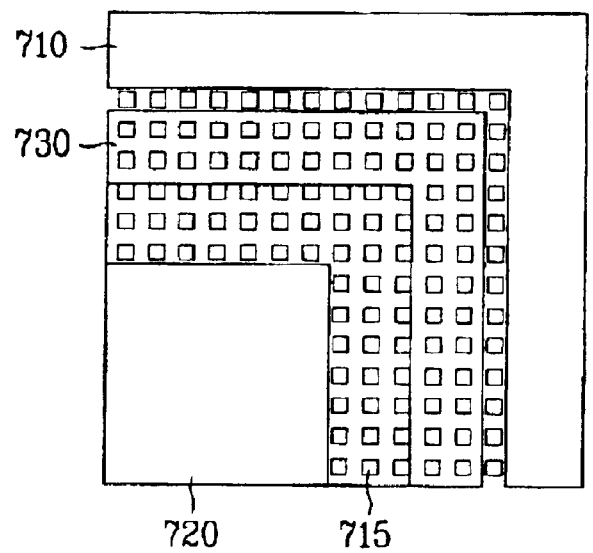
FIG. 4B schematically illustrates a magnified view of an area "B" in FIG. 4A according to the first embodiment of the present invention.

FIG. 4B schematically illustrates a magnified view of an area "B" in FIG. 4A according to the first embodiment of the present invention.

Referring to FIG. 4B, the second column spacers 715 are formed between the inside of the UV-ray hardening sealant pattern 710 and the outside of the active area 720. Due to this structure, a cell gap around the UV-ray hardening sealant pattern 710 can be uniformly maintained. Moreover, a stress between the substrates 700 and 750 generated from adhesion of the UV-ray hardening sealant pattern 710 can be removed.

Figure 4C:
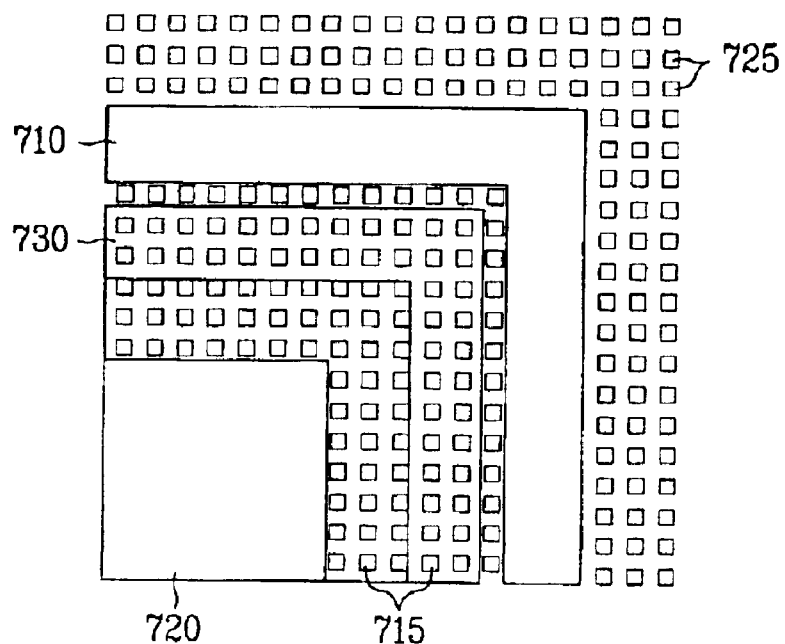
FIG. 4C schematically illustrates a magnified view of an area "B" in FIG. 4A according to the second to fourth embodiments of the present invention.

FIG. 4C schematically illustrates a magnified view of an area "B" in FIG. 4A according to the second to fourth embodiments of the present invention.

Referring to FIG. 4C, the second column spacers 715 are formed on the second substrate 750 between the inside of the UV-ray hardening sealant pattern 710 and the outside of the active area 720. Simultaneously, the third column spacer 725 is formed on the second substrate 750 outside the UV-ray hardening sealant pattern 710.

Thus, the first column spacers 705 (shown in FIG. 4A) are formed inside the active area 720, thereby uniformly maintaining a cell gap inside the active area 720. Meanwhile, since the second column spacers 715 are formed inside the UV-ray hardening sealant pattern 710, and the third column spacers 725 are formed outside the UV-ray hardening sealant pattern, a cell gap surrounding the UV-ray hardening sealant pattern 710 can be uniformly maintained. In addition, a cell gap across the entire surface of the liquid crystal display panel can also be uniformly maintained.

More specifically, the second and third column spacers 715 and 725, which are respectively formed inside and outside the UV-ray hardening sealant pattern 710, spread and reduce the stress caused by the UV-ray hardening sealant pattern 710. In this case, at least two of the second and third column spacers are formed inside and outside the UV-ray hardening sealant pattern 710, respectively.

FIGS. 5A to 5G are layouts and cross-sectional views illustrating a process of fabricating a liquid crystal display device using a liquid crystal dropping method according to the present invention.

Figure 5A:
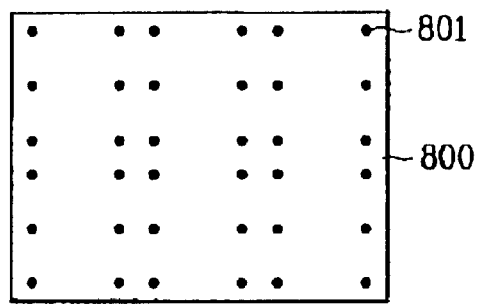
FIGS. 5A to 5G illustrate layouts and cross-sectional views illustrating a process of fabricating a liquid crystal display device using a liquid crystal dropping method according to the present invention.

Referring to FIG. 5A, silver (Ag) patterns 801 are formed on a first substrate 800.

Figure 5B:
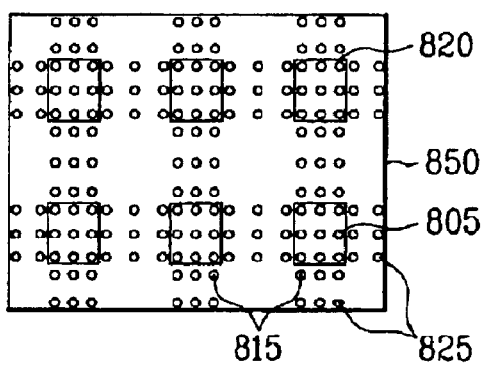

As shown in FIG. 5B, first column spacers 805 are formed inside the active area 820 of a second substrate 850. Second and third column spacers 815 and 825 are formed outside the active area 820 of on the second substrate 850.

The first column spacer 805 is formed on the second substrate 850 corresponding to a wiring part of the first substrate 800. Meanwhile, the second and third column spacers 815 and 825 are respectively located at the inside and outside areas of a UV-ray hardening sealant pattern 810 that will be formed in a later process.

Figure 5C:
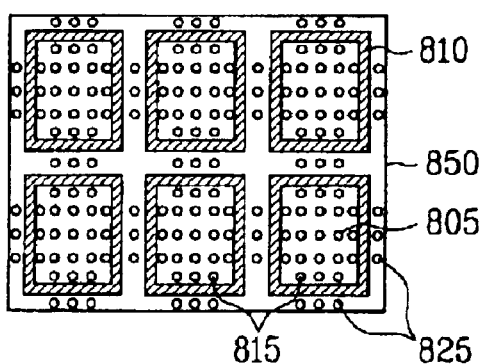

Referring to FIG. 5C, a UV-ray hardening sealant pattern 810 is formed on the second substrate 850 between the second and third column spacers 815 and 825.

Figure 5D:
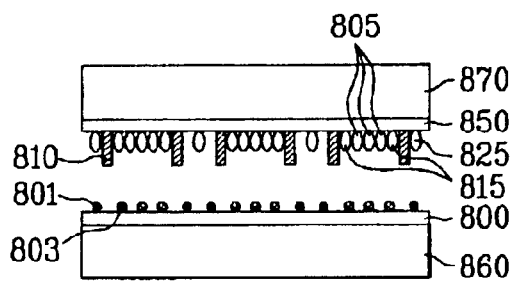

As shown in FIG. 5D, liquid crystal droplets 803 are dispensed on the first substrate 800. The second substrate 850 is disposed over the first substrate 800 to face into a bonding machine (not shown), and the first and second substrates 800 and 850 are then bonded to each other.

More specifically, the second substrate 850 is fixed to an upper stage 870 providing movement in the Z-axis direction (i.e., vertical direction) of the bonding machine. Meanwhile, the silver (Ag) patterns 801 are formed in a region of the first substrate 800 corresponding to the outside area of the UV-ray hardening sealant pattern 810. Moreover, the first substrate 800 is fixed to a lower stage 860 providing movement in the X and Y axes directions (i.e., horizontal direction) of the bonding machine.

Figure 5E:
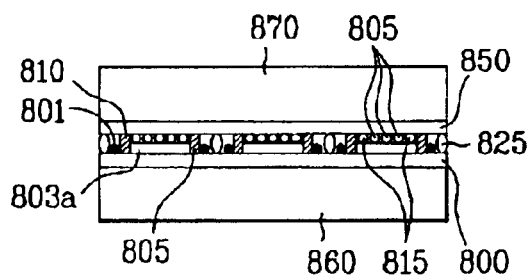
Figure 5F:
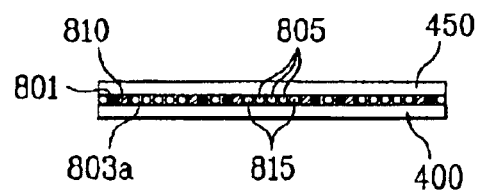

As shown in FIG. 5E, the upper and lower stages 870 and 860 are aligned to each other, and a vacuum condition within the bonding machine is controlled until a desired vacuum level is reached. Hence, the first and second substrates 800 and 850 are bonded to each other. After the substrates 800 and 850 are bonded to each other, the first, second, and third column spacers 805, 815, and 825 uniformly form a first cell gap.

As shown in FIG. 5E, the bonded substrates 800 and 850 are exposed to the atmospheric pressure. Nitrogen gas ($N_2$) or air is introduced into a chamber of the bonding machine so as to make a pressure of the chamber become the atmospheric pressure. Accordingly, the substrates bonded with the first gap are under a vacuum condition, and the chamber maintains the atmospheric pressure. Stress is generated between the bonded substrates due to a pressure difference between the inside of the liquid crystal display panel and the atmospheric pressure. Thus, a second cell gap is uniformly formed between the bonded substrates 800 and 850 by the first to third column spacers 805, 815, and 825. Therefore, the dispensed liquid crystal droplets become a liquid crystal layer 803*a* having a uniform thickness.

Figure 5G:
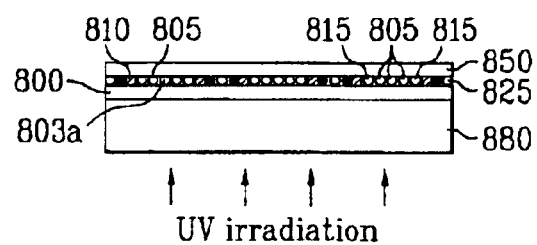

Referring to FIG. 5G, the bonded substrates 800 and 850 are placed on a transparent quartz stage 880. UV-ray is then irradiated to the UV-ray hardening sealant pattern 810 to harden the UV-ray hardening sealant pattern 810.

Accordingly, the liquid crystal display device and the method of fabricating the same according to the present invention have the following effects or advantages.

The column spacers are formed on at least one of the outside and inside areas of the UV-ray hardening sealant pattern, thereby uniformly maintaining the cell gap surrounding the UV-ray hardening sealant pattern.

Additionally, since the column spacers are formed on at least one of the outside and inside areas of the UV-ray hardening sealant pattern, stress on the substrates may be released by the UV-ray hardening sealant.

It will be apparent to those skilled in the art that various modifications and variations can be made in the liquid crystal display device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   first and second substrates bonded to each other, each having a liquid crystal display panel region divided into an active area and a dummy area;
   a sealant in a periphery of the liquid crystal display panel region bonding the first and second substrates to each other;
   at least one column spacer both in the dummy area and outside the liquid crystal display panel region maintaining a cell gap between the first and second substrates; and
   a liquid crystal layer between the first and second substrates.

2. The device of claim 1, wherein the sealant is a photo-hardening sealant.

3. The device of claim 1, wherein the sealant is a mixture of thermo and UV hardening sealants.

4. The device of claim 1, further comprising at least one column spacer in the active area.

5. A liquid crystal display device, comprising:
- a first substrate having a liquid crystal display panel region divided into an active area and a dummy area;
- a second substrate bonded to the first substrate;
- a plurality of first column spacers in the liquid crystal display panel region;
- a sealant in a periphery of the liquid crystal display panel region to bond the first and second substrates to each other;
- a plurality of second column spacers outside the liquid crystal display panel region around the sealant; and
- a liquid crystal layer between the first and second substrates.

6. The device of claim 5, wherein the sealant is a UV-ray hardening sealant.

7. The device of claim 5, further comprising an alignment layer on at least one of the first and second substrates.

8. The device of claim 5, further comprising at least one silver pattern on the first substrate outside a pattern of the sealant.

9. A liquid crystal display device, comprising:
- first and second substrates bonded to each other, each having a liquid crystal display panel region divided by an active area and a dummy area;
- at least one first column spacer in the active area;
- at least one second column spacer in the dummy area;
- at least one third column spacer outside the liquid crystal display panel region;
- a sealant in a periphery of the liquid crystal display panel region bonding the first and second substrates to each other; and
- a liquid crystal layer between the first and second substrates.

10. The device of claim 9, wherein the sealant is a photo-hardening sealant.

11. The device of claim 9, further comprising an alignment layer on at least one of the first and second substrates.

12. The device of claim 9, further comprising at least one silver pattern on the first substrate outside a pattern of the sealant.

13. A method of fabricating a liquid crystal display device, comprising:
- preparing first and second substrates having a liquid crystal display panel region divided into an active area and a dummy area;
- dispensing at least one liquid crystal droplet in the liquid crystal display panel region of the first substrate;
- forming at least one first column spacer in the active area of the second substrate;
- forming at least one second column spacer in the dummy area of the second substrate;
- forming at least one third column spacer outside the liquid crystal display panel region of the second substrate;
- forming a sealant in a periphery of the liquid crystal display panel region of the second substrate; and
- bonding the first and second substrates to each other.

14. The method of claim 13, wherein the sealant is a UV-ray hardening sealant.

15. The method of claim 13, further comprising forming at least one silver pattern in a periphery of the liquid crystal display panel region of the first substrate before dispensing the liquid crystal droplet.

16. The method of claim 13, wherein the bonding the first and second substrates to each other includes:
- loading the second substrate on an upper stage of a bonding machine to face into the first substrate;
- loading the first substrate on a lower stage of the bonding machine;
- evacuating a chamber of the bonding machine;
- aligning the first and second substrates; and
- attaching the first and second substrates to each other.

17. The method of claim 16, wherein the bonding the first and second substrates to each other, further comprising:
- venting the chamber to an atmospheric pressure to press the attached substrates by difference between an inner pressure of the bonded substrates and the atmospheric pressure; and
- applying a UV-ray to the sealant to harden the sealant.

18. The method of claim 13, wherein each of the first to third column spacers is about 5 to 30 $\mu$m in width.

19. The method of claim 13, wherein the first to third column spacers are formed of organic resin.

20. The method of claim 19, wherein the first to third column spacers are formed of photo-reactive resin.

* * * * *